(12) United States Patent
Collins

(10) Patent No.: US 6,347,677 B1
(45) Date of Patent: Feb. 19, 2002

(54) TRAILER MANEUVERING JACK WITH A COMPACT DRIVE WHEEL

(76) Inventor: Joe H. Collins, 87749 Collins La., Springfield, OR (US) 97478

( * ) Notice: Subject to any disclaimer, the term of this patent is extended or adjusted under 35 U.S.C. 154(b) by 0 days.

(21) Appl. No.: 09/516,853

(22) Filed: Mar. 2, 2000

Related U.S. Application Data

(60) Provisional application No. 60/122,411, filed on Mar. 2, 1999.

(51) Int. Cl.$^7$ ................................................. B60D 7/14
(52) U.S. Cl. ........................................ 180/13; 180/14.2
(58) Field of Search ............................... 180/11, 12, 13, 180/19.1, 19.2, 65.5, 14.2; 280/767, 475

(56) References Cited

U.S. PATENT DOCUMENTS

| | | | | |
|---|---|---|---|---|
| 3,356,172 A | * | 12/1967 | Peckham et al. | |
| 3,783,960 A | * | 1/1974 | Feliz | |
| 3,861,482 A | * | 1/1975 | Stephens et al. | |
| 4,162,711 A | * | 7/1979 | Cornelius | |
| 4,210,217 A | * | 7/1980 | Lachowicz | |
| 4,799,697 A | * | 1/1989 | Williamson et al. | |
| 4,860,841 A | * | 8/1989 | Sacco | |

* cited by examiner

Primary Examiner—Robert P. Olszewski
Assistant Examiner—Andrew J. Fischer
(74) Attorney, Agent, or Firm—Robert E. Howard

(57) ABSTRACT

A trailer maneuvering jack comprised of a tongue jack and a compact drive wheel assembly. The tongue jack is comprised of an outer sleeve and an extendable and retractable inner sleeve. The drive wheel assembly is comprised of a wheel, motor, and drive train. The drive wheel assembly is attached to the outer end of the inner sleeve of the tongue jack by means of a power drive mounting bracket. The wheel is located along the longitudinal centerline of the tongue jack with its axle perpendicular thereto. The axis of the drive shaft of the motor is located along the wheel axle axis and operably connected thereto by a drive train. In a first embodiment the motor case is cylindrical and it and cylindrical bearing means mounted thereon constitute the axle of the drive wheel. In a second embodiment a rotational ring gear forms the axle of the wheel.

4 Claims, 2 Drawing Sheets

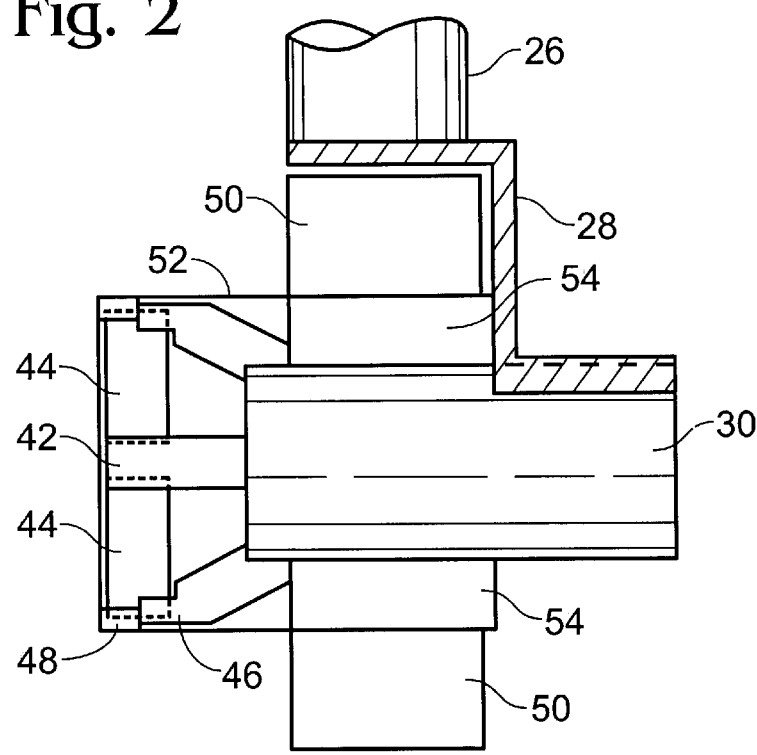
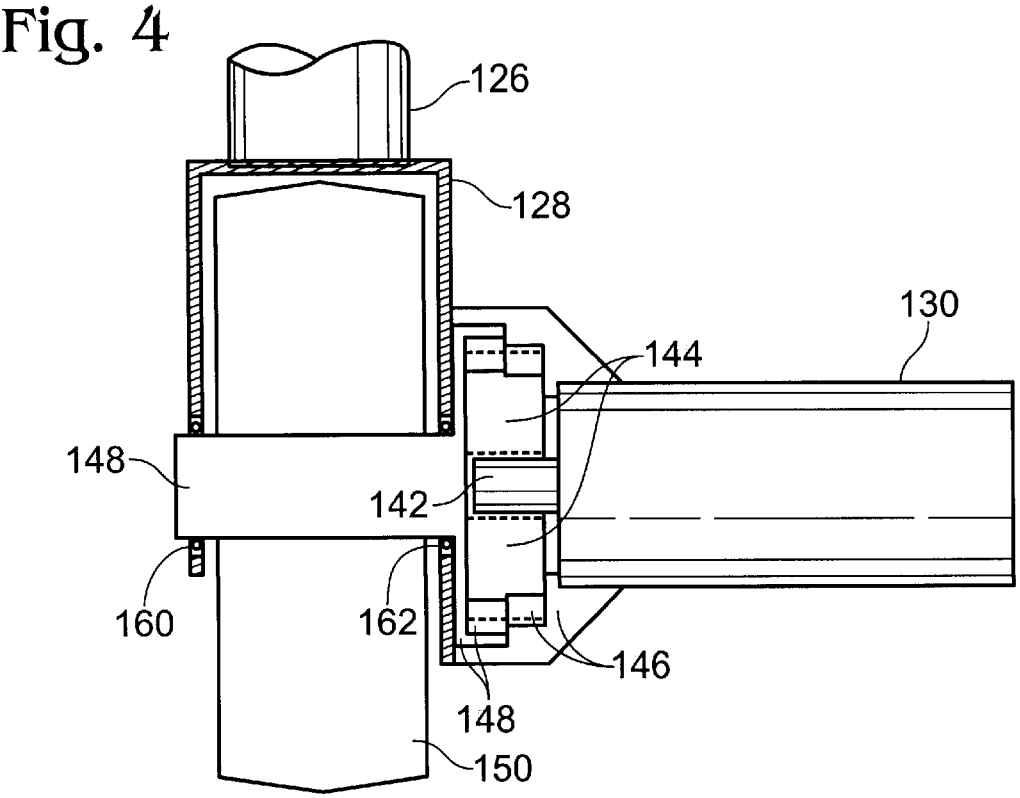

TRAILER MANEUVERING JACK WITH A COMPACT DRIVE WHEEL

CROSS-REFERENCE TO RELATED APPLICATIONS

This application claims the benefit of U.S. Provisional Application No. 60/122,411, filed Mar. 2, 1999, the entire contents of which are hereby incorporated by reference.

BACKGROUND OF THE INVENTION

This invention relates to a motorized trailer maneuvering jack having a compact power drive wheel.

The need to maneuver a conventional trailer while uncoupled from its tow vehicle (to aid in coupling, uncoupling, or general maneuvering) is well known in the art. Various maneuvering jack drives for conventional trailers have been proposed.

U.S. Pat. No. 3,783,960 describes one such trailer maneuvering jack. The device described in this patent is quite bulky, complex, and expensive to build. The bulkiness of this design affects the operation of the trailer in several ways, including extra tongue weight, setback of the drive assembly in the tongue A-frame which in some cases interferes with trailer payload, rotational interference of the drive motor and/or wheel with the tongue when maneuvering the trailer with the tongue lowered, and undesirable twist or side torque when used with a straight tongue.

U.S. Pat. No. 3,861,482 describes another such trailer maneuvering device. This device is also quite bulky which, if used in a tongue A-frame, does not allow it to be mounted as far forward as is desirable. Also, with a straight tongue, the offset mounting will impart undesirable twist or torque.

U.S. Pat. No. 4,860,841 describes still another such device for maneuvering a trailer. In a first embodiment described in this patent the described device employs two ground contacting wheels attached to the jack which makes it hard to steer since one wheel will slide if the direction of travel is changed. Also, the device is mechanically complex which increases cost. The second embodiment of this patent shows one wheel set to the side of a tongue jack end, which causes torque around the tongue jack centerline and urges the tongue jack to rotate in circles. The offset power wheel also limits compactness and interferes with tongue clearance, especially when fully retracted.

SUMMARY OF THE INVENTION

It is an object of this invention to provide a simple, compact, and easily maneuverable power driven wheel assembly for a trailer jack.

It is a further object to provide an assembly that will nest forward into the tongue A-frame to increase payload space and provide more ground clearance while still being able to rotate 360 degrees.

It is a still further object to provide a drive head that can be fully retracted at an angle without contacting the tongue.

It is a another object to provide a drive head that will reduce or eliminate tongue twist around the tongue centerline when mounted on a straight tongue trailer.

The trailer maneuvering jack of the invention has a compact drive wheel attached to the extendable inner sleeve or rod of a tongue jack in such a manner that it is located along the longitudinal axis of the tongue jack, the axle of the wheel being perpendicular to the longitudinal axis of the tongue jack.

The tongue jack is preferably comprised of a cylindrical outer sleeve and a cylindrical inner sleeve or rod located within the outer sleeve, the inner sleeve or rod having a longitudinal axis coaxial with the longitudinal axis of the outer sleeve. However, the inner and outer sleeves may be non-cylindrical.

A power drive mounting bracket is attached at its upper end to the lower end of the inner sleeve or rod, the lower end of the bracket being attached to a drive wheel assembly comprised of a motor, drive train, and wheel. The centerline of the motor is located at the wheel axle centerline.

In a first embodiment the case of the motor is cylindrical and constitutes the axle of the wheel, the wheel being mounted thereon by wheel bearing means. The drive shaft of the motor is operably connected to the wheel by a drive train. The drive train is comprised of the drive shaft of the motor the outer end of which constitutes a pinion gear that drives a planetary gear set that meshes with and drives a rotational ring gear. A drive sleeve attached to the wheel bearing is driven by the rotational ring gear.

In a second embodiment of the invention the rotational ring gear forms the axle of the wheel.

BRIEF DESCRIPTION OF THE DRAWINGS

FIG. 2 is an enlarged view of the drive wheel head of the first embodiment of the invention;

FIG. 4 is an enlarged view of the drive wheel head of the second embodiment of the invention.

DESCRIPTION OF THE PREFERRED EMBODIMENTS

Figure 1:
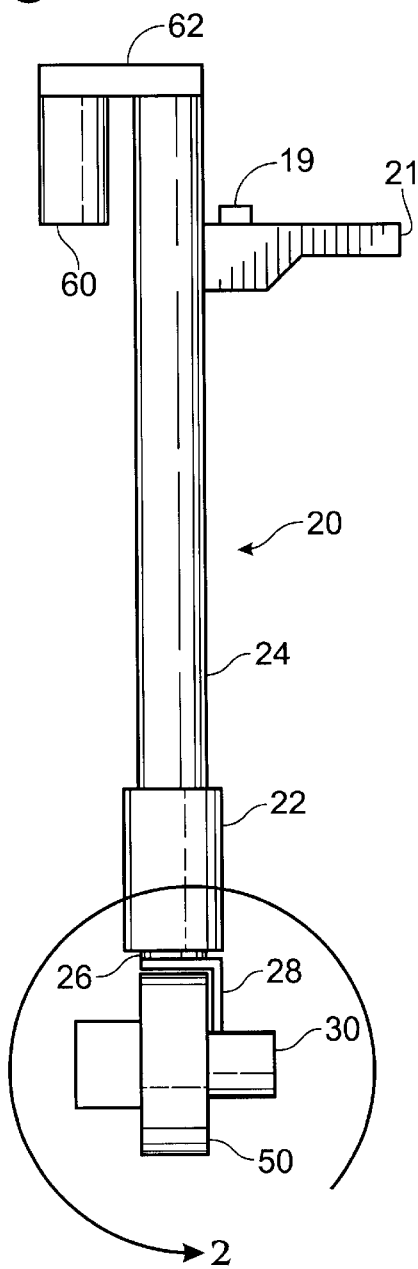
FIG. 1 is a front elevation view of a first embodiment of the drive wheel head and tongue jack of the invention.

FIGS. 1 and 2 illustrate a first preferred embodiment of the invention.

A vertically disposed linear actuator or tongue jack 20 has a handle 21 securely mounted to an upper portion of the outer sleeve 24 thereof.

A linear actuator rotational/thrust bearing 22 encircles and is rotatably attached to linear actuator outer sleeve 24 at its lower end. Rotational/thrust bearing 22 is adapted to be mountable on a trailer tongue of either the A-frame or straight type.

Linear actuator inner sleeve or rod 26 is adapted to be extended downwardly from inside outer sleeve 24 and to be retracted back into outer sleeve 24 by suitable manual or power actuated means. Inner sleeve 26 has an inner end located within outer sleeve 24 and an outer end which extends outwardly beyond the corresponding end of outer sleeve 24. In FIG. 1 inner sleeve 26 is shown in its retracted position.

A power drive mounting bracket 28 is secured to the outer end of inner sleeve 26, as best seen in FIG. 2. Mounting bracket 28 is essentially Z-shaped with upper and lower horizontally disposed legs attached to a vertical leg, as shown.

The cylindrical outer case of an electric motor 30 is secured to the lower horizontal leg of power drive mounting bracket 28, as shown, by any suitable means such as bolts. Motor 30 is electrically connected by suitable wiring to forward/reverse switch 19 mounted on handle 21, and to a suitable electric power source, such as a battery located on the trailer.

As best seen in FIG. 2, a stationary ring gear 46 is secured to the case of motor 30. Motor drive shaft/pinion gear 42 engages a planetary gear set comprised of three planetary gears 44, only two of which are shown in FIG. 2. Planetary gears 44 of the planetary gear set also engage both stationary ring gear 46 and rotational ring gear 48 in the manner well known in the gear art. Rotational ring gear 48 is secured to drive sleeve 52. Drive sleeve 52 is secured to both drive wheel 50 and drive wheel bearing 54. Drive wheel 50 and drive wheel bearing 54 rotate about the cylindrical case of motor 30.

The motor and drive train just described is commercially available as a Model T1500 "SUPERWINCH"(a registered trademark of Superwinch, Inc.

It can be seen in FIG. 1 that drive wheel 50 is mounted along the longitudinal axis of tongue jack 20 with the axle of wheel 50 (the case of motor 30) being perpendicular thereto. The axis of the axle of wheel 50 and the axis of the drive shaft 42 are in alignment.

In operation, the trailer coupler is first released and all safety chains and electrical couplers disconnected. The inner sleeve 26 of linear actuator (tongue jack) 20 (which in the trailer towing mode is retracted) is extended to or beyond the point at which the trailer coupler clears the tow vehicle coupler ball hitch.

The linear actuator (tongue jack) 20, which does not, per se, form a part of the present invention, may be any conventional tongue jack having a cylindrical outer sleeve and a cylindrical inner sleeve or rod slidable relative to the outer sleeve and that can be extended and retracted by either manually operated means or by power operated means (including electrical, hydraulic, or other power operated means), such as motor 60 and gear drive 62.

With the trailer coupler clear of the tow vehicle ball hitch, power drive forward/reverse switch 19 is activated to drive wheel 50 in the reverse direction, i.e., away from the tow vehicle. Steering is accomplished by way of steering handle 21. The tongue jack outer sleeve 24 is adapted to rotate about its longitudinal axis inside thrust bearing 22, thrust bearing 22 being securely attached to the trailer tongue.

The inner sleeve 26 of tongue jack 20 is adapted to extend from, or retract into, outer sleeve 24 by any suitable means known in the tongue jack art, and inner sleeve 26 is prevented from turning independently of outer sleeve 24 by any suitable means known in the tongue jack art.

The upper horizontal leg of power drive mounting bracket 28 is rigidly secured to the bottom of inner sleeve 26, and the lower horizontal leg thereof is secured to the case of motor 30 which, in this embodiment, acts as a thrust surface for wheel bearing 54. Power drive mounting bracket 28 is fashioned in such a way that it allows clearance for drive wheel 50, and maintains drive wheel 50 positioned under the centerline of inner sleeve 26. For assembly and disassembly purposes, power drive mounting bracket 28 is releasably secured to the case of motor 30 by suitable fastening means such as bolts.

The drive shaft/pinion gear 42 of motor 30 drives the three gear planetary gear set. The planetary gear set meshes with, or engages, both stationary ring gear 46 and rotational ring gear 48. Rotational ring gear 48 is, in this embodiment, three teeth larger in diameter than stationary ring gear 46. As the three gears of the planetary gear set are forced to "walk" around or advance around stationary ring gear 46, rotational ring gear 48 is forced forward one tooth per one third revolution, or three teeth per full revolution.

Although a three gear planetary gear set has been described, other planetary gear sets may be used. If a four gear planetary gear set is used, the rotational ring gear should have four more teeth than the stationary ring gear in order to load each planetary gear evenly, and so on, with more or less numbers of gears in the planetary set.

Alternatively, the function of ring gears 46 and 48 may be reversed so that rotational ring gear 48 becomes the stationary ring gear, and the stationary ring gear 46 becomes the driven ring gear. Similar results will be achieved, although the direction of the rotational ring gear will be reversed in relation to the motor rotation.

It is also feasible to use a non-planetary gear drive train so long as the axis of the axle of the drive wheel 50 is in alignment with the axis of the drive shaft 42, and drive wheel 50 is centered on the coaxial longitudinal axis of the outer and inner sleeves 24 and 26 of the linear actuator 20.

Rotational ring gear 48 is secured to one end of drive sleeve 52 thereby forcing it to rotate with rotational ring gear 48. Drive sleeve 52 is rotationally held in alignment by the outer surface of stationary gear 46 acting as an outboard bearing for drive sleeve 52. The other end of drive sleeve 52 is secured to wheel bearing 54 and drive wheel 50. Wheel bearing 54 is held between the housing of stationary ring gear 46 and power drive mounting bracket 28. Wheel bearing 54 is adapted to rotate around the cylindrical case of motor 30.

Drive wheel 50, when powered and in contact with the ground, propels the trailer according to the direction steered by means of handle 21 and according to the position of forward/reverse switch 19.

The embodiment just described enables the drive wheel head of the invention to be retracted to allow full ground clearance while towing, and at the same time interferes as little as possible with the trailer payload. The compact drive wheel of the invention can nest further forward in an A-frame tongue configuration, rotate 360 degrees fully retracted, and track straight for ease of steering.

When the above-described embodiment is adapted to a straight tongue configuration, as opposed to an A-frame configuration, it can rotate 360 degrees fully retracted, may be mounted with less offset from the tongue centerline than previous devices, and will track straight without torque caused steering problems.

Figure 3:
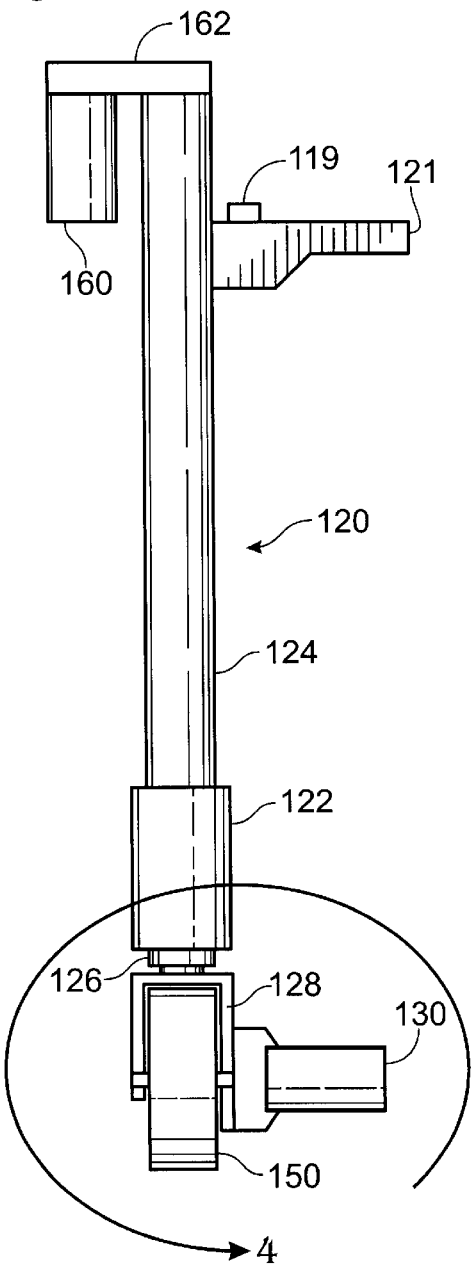
FIG. 3 is a front elevation view of a second embodiment of the drive wheel head and tongue jack of the invention.

A second embodiment of the invention is illustrated in FIGS. 3 and 4. The reference numbers used in describing the first embodiment illustrated in FIGS. 1 and 2 are used to describe corresponding parts of the second embodiment illustrated in FIGS. 3 and 4 but with "100" added thereto.

Thus, in FIGS. 3 and 4, vertically disposed linear actuator or tongue jack 120 (which is identical to tongue jack 20 of the first embodiment) has a handle 121 securely mounted to an upper portion of cylindrical outer sleeve 124.

A linear actuator rotational/thrust bearing 122 encircles and is rotatably attached to linear actuator outer sleeve 124 at its lower end. Rotational/thrust bearing 122 is adapted to be mountable on a trailer tongue of either the A-frame or straight type.

Linear actuator cylindrical inner sleeve or rod 126 is adapted to be extended downwardly from inside outer sleeve 124 and to be retracted back into cylindrical outer sleeve 124 by any suitable manual or power operated means. In FIG. 3 inner sleeve 126 is shown in its retracted position.

Power drive mounting bracket 128 is secured to the lower end of inner sleeve 126, as best seen in FIG. 4. Mounting bracket 128 is an inverted U-shape having vertical legs extending downwardly from each end of an upper horizontal leg.

The cylindrical outer case of an electric motor 130 is secured to power drive mounting bracket 128 by means of stationary ring gear 146, as shown. Motor 130 is electrically connected by suitable wiring to forward/reverse switch 119 mounted on handle 121, and to a suitable electric power source, such as a battery located on the trailer.

A drive wheel 150 is secured to rotational ring gear/drive axle 148. Drive axle 148 has bearings 160 and 162 located at each end, respectively, at its intersection with power drive mounting bracket 128.

Rotational ring gear 148 rotates inside a sleeve which is an integral extension of the housing of stationary ring gear 146.

Similar to the embodiment described above relative to FIGS. 1 and 2, the three gears 144 (only two of which are shown in FIG. 4) three gear planetary gear set engage both rotational ring gear and stationary ring gear 146, and also engage motor pinion gear 142

Stationary ring gear 146 is secured firmly and rigidly to both the case of motor 130 and power drive mounting bracket 128.

Power drive mounting bracket 128 supports rotational ring gear/drive axle 148 with a bearing at each end of drive axle 148. Power drive mounting bracket 28 is secured to the outer end of inner sleeve 126 of linear actuator 120.

Rotational ring gear 148 is held in alignment internally in the stationary gear housing 146 to align with the three gears 144 of the three gear planetary gear set.

Rotational ring gear 148 may drive the drive axle 148 directly or through a suitable coupling means to allow for slight misalignment of parts.

As in the case of the first embodiment illustrated in FIGS. 1 and 2, the second embodiment of FIGS. 3 and 4 has its wheel 150 located along the longitudinal axis of tongue jack 120 with its axle 148 being perpendicular thereto, and with the axis of drive shaft 142 and the axis of axle 148 being in alignment.

The invention claimed is:

1. In a motorized trailer maneuvering jack including a linear actuator having an outer sleeve, an inner sleeve positioned within said outer sleeve, said outer and inner sleeves having a coaxial longitudinal axis, said outer and inner sleeves having corresponding upper and lower ends, respectively, means for extending and retracting said inner sleeve relative to said outer sleeve, a wheel having a hub rotatably attached to said inner sleeve at its lower end, a motor for driving said wheel, and means for steering said wheel, the improvement comprising:

a power drive mounting bracket attached to the lower end of said inner sleeve;

said motor having a cylindrical outer case with first and second ends, said motor having a drive shaft/pinion gear extending from said first end, said second end of said motor being attached to said power drive mounting bracket, said cylindrical outer case of said motor having a longitudinal axis that is perpendicular to said coaxial longitudinal axis of said outer and inner sleeves;

a cylindrical wheel bearing coaxially secured to said hub of said wheel, said wheel bearing being rotatably mounted on said cylindrical outer case of said motor between said first and second ends, said wheel being substantially centered on said coaxial longitudinal axis of said outer and inner sleeves;

said drive shaft/pinion gear engaging a gear drive train adapted to be secured to said wheel and wheel bearing and to rotate said wheel and wheel bearing upon actuation of said motor, said drive train including a plurality of planetary gears driven by said drive shaft/pinion gear, said planetary gears being in meshing engagement with, and rotatable within, a stationary ring gear, said planetary gears also being in meshing engagement with a rotational ring gear, said rotational ring gear being driven by said planetary gears upon actuation of said motor, said rotational ring gear being attached to said wheel and wheel bearing by means of a drive sleeve, said drive sleeve being adapted to cause rotation of said wheel and wheel bearing upon rotation of said rotational ring gear.

2. The motorized trailer maneuvering jack of claim 1 wherein said gear drive train includes at least three planetary gears driven by said drive shaft/pinion gear.

3. The motorized trailer maneuvering jack of claim 2 wherein said rotational ring gear is larger than said stationary ring gear by the number of gear teeth equal to the number of said planetary gears.

4. The motorized trailer maneuvering jack of claim 2 wherein said gear drive train includes three planetary gears, and said rotational ring gear is three teeth larger than said stationary ring gear.

* * * * *